United States Patent [19]
Whitcher et al.
[11] 4,195,059
[45] Mar. 25, 1980

[54] CHEMICAL TEST KIT

[75] Inventors: Kayleen S. Whitcher, Adrian; Mary Jo Benner, Ann Arbor, both of Mich.

[73] Assignee: Aquaphase Laboratories, Inc., Adrian, Mich.

[21] Appl. No.: 803,361

[22] Filed: Jun. 3, 1977

Related U.S. Application Data

[63] Continuation of Ser. No. 686,318, May 14, 1976, abandoned.

[51] Int. Cl.² .............................................. G01N 31/00

[52] U.S. Cl. ....................................... 422/61; 206/459; 206/569

[58] Field of Search ..................... 23/259, 253 R, 292; 206/232, 305, 459, 803, 569; 422/99, 102, 61

[56] References Cited

U.S. PATENT DOCUMENTS

| | | | |
|---|---|---|---|
| 2,410,928 | 4/1946 | Christner et al. | 206/569 |
| 3,272,319 | 9/1966 | Brewer | 206/569 |
| 3,446,342 | 5/1969 | Michel | 206/232 |
| 3,519,005 | 7/1970 | Krezanoski et al. | 206/5.1 X |
| 3,554,703 | 1/1971 | Moss | 23/253 R |
| 3,743,088 | 7/1973 | Henkin | 23/259 X |
| 3,899,298 | 8/1975 | Szczesniak | 23/253 R |
| 3,905,772 | 9/1975 | Hartnett et al. | 23/259 |
| 3,948,606 | 4/1976 | Johnson | 23/259 |
| 3,957,436 | 5/1976 | Murray | 23/230 B X |
| 3,981,398 | 9/1976 | Boshoff | 206/232 X |

*Primary Examiner*—Arnold Turk
*Attorney, Agent, or Firm*—Barnes, Kisselle, Raisch & Choate

[57] ABSTRACT

A chemical test kit comprising a housing, a cover for the housing. A divider in the housing divides the housing into a plurality of compartments. Each compartment has a plurality of container receiving positions, and a plurality of chemical containers are provided in the positions of each compartment. Each container has first written indicia thereon and second color indicia thereon. The containers in each compartment have different written indicia and the containers in each compartment having the same color indicia. A label in the cover contains written instructions for use of the chemicals in each compartment and is divided into portions having color indicia corresponding to the color indicia on the bottles in each compartment.

8 Claims, 6 Drawing Figures

CHEMICAL TEST KIT

This is a continuation of application Ser. No. 686,318, filed May 14, 1976 now abandoned.

This invention relates to chemical test kits and particularly to such kits for use by non-scientific personnel such as boiler engineers for testing water in boiler and other water circulation systems.

BACKGROUND OF THE INVENTION

In the treatment of boiler water and the like, it is necessary to periodically run chemical tests such as alkalinity tests to determine the condition of the water. Heretofore such tests have been conducted by the utilization of a kit that contains the various chemicals and instructions supplied with the kit to a user as to the manner in which the tests are to be conducted. Since the test kits utilize the chemical names of the reagents, the test appears particularly difficult to a scientifically untrained person such as a boiler engineer. It is thus possible for errors to be made in the test.

Accordingly, among the objects of the invention are to provide a chemical test kit which can be used by non-scientifically trained personnel such as boiler engineers; which will minimize the chances for error; which provides for the possibility that the user may be color blind; and which is self-instructing or necessitates a minimum of personal instruction for use.

SUMMARY OF THE INVENTION

In accordance with the invention, the chemical test kit comprises a housing and a cover for the housing. Means within said housing divide the housing into a plurality of container receiving positions. A plurality of chemical containers is provided in the positions of each compartment. Each container has first written indicia thereon and second color indicia thereon. The containers in each compartment have different written indicia and the containers in each compartment having the same color indicia. Instructions for use of the chemicals in each compartment are provided on the cover and have color indicia associated therewith corresponding to the color indicia on the bottles in each compartment.

DESCRIPTION

Figure 1:
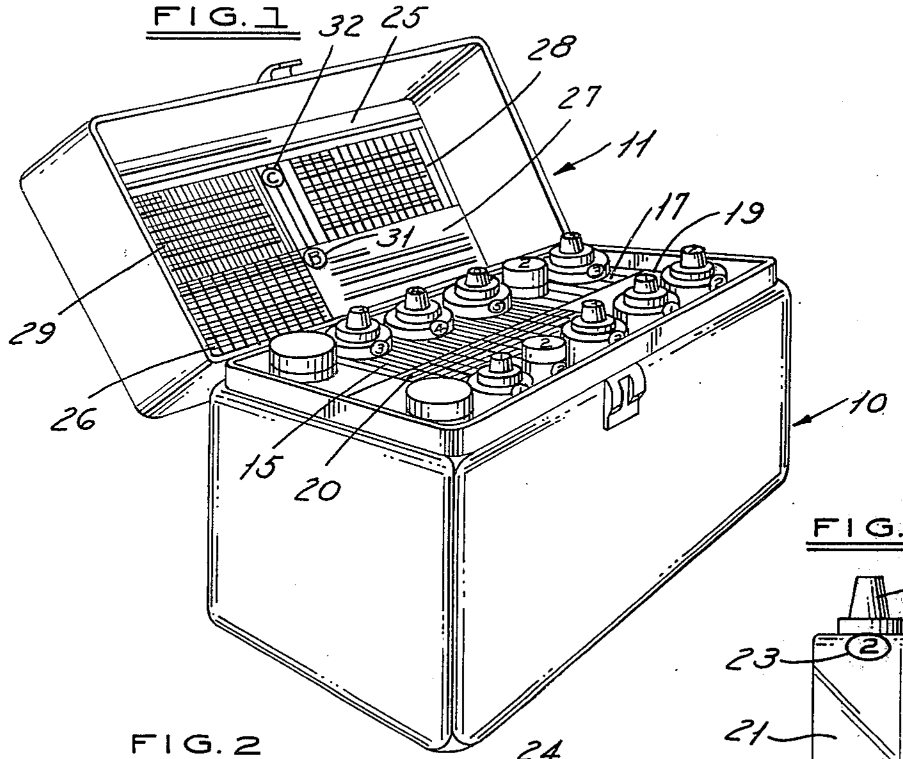
FIG. 1 is a perspective view of a chemical test kit embodying the invention with the cover open.

Referring to FIG. 1, the chemical test kit embodying the invention comprises a housing 10 including a cover 11 hinged thereto.

A divider 12 is positioned within the housing to define a plurality of positions 13 for containers as presently described.

The divider 12 has color indicia thereon to divide the interior of the housing 10 into compartments or sections. Thus one area of the interior of the housing is defined by the white area 14 having two container receiving positions. Another area of the divider 12 is formed with red indicia as at 15 to define a compartment having three container receiving positions. A further area of the divider 12 is colored blue as at 16 to define another compartment having three container receiving positions. A further area 17 is colored white and has vertical parallel lines 18 distinguishing the area while a still further area 19 is colored white. The area 16 further includes cross hatched or perpendicular lines 20. In this manner the areas are color coded in accordance with the different tests. Further in order to accommodate color blind persons, those areas that might be indistinguishable to a color blind person are provided with the further indicia in the form of lines 18, 20 that can be readily distinguished by a color blind person. More specifically, the lines 18 comprise parallel lines whereas the lines 20 comprise intersecting lines. It will be appreciated that lines as well as shading representing coloring are shown in the drawings.

Figure 4:
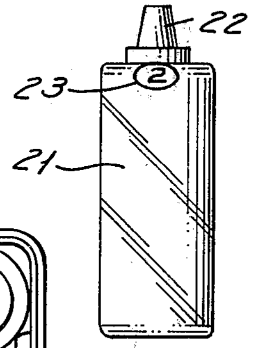
FIG. 4 is an elevational view of a typical container used in the test kit.
Figure 2:
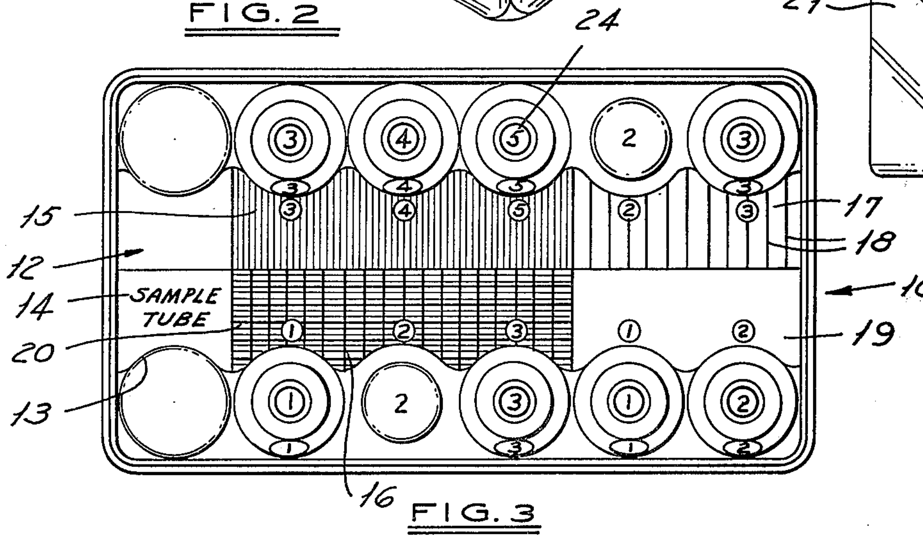
FIG. 2 is a plan view thereof with the cover removed.
Figure 3:
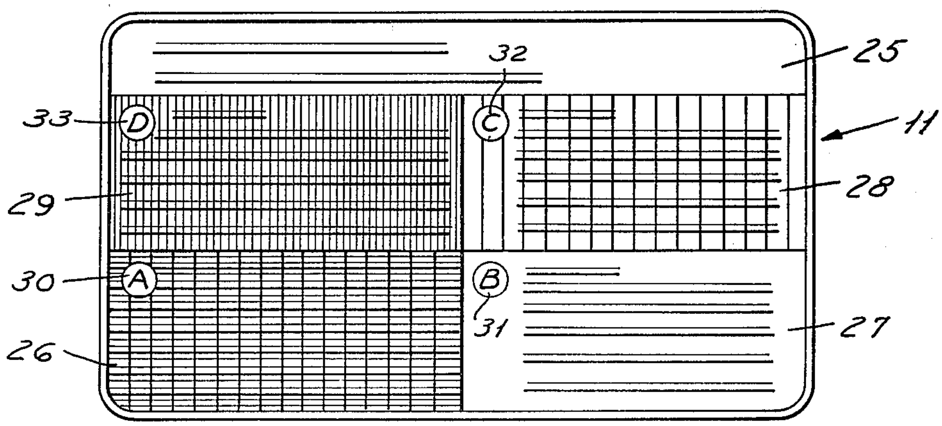
FIG. 3 is a bottom plan view of the cover.

The containers placed in each position are as shown in FIG. 4 and comprise a bottle 21 having a cap 22. Each bottle 21 has a label 23 and each cap has a label 24. The labels 23, 24 are color coded to conform to the compartment or area of the housing in which the container is to be placed. Further each label 23, 24 is provided with a number or letter indicia indicating the consecutive order in which the reagents in the bottle are to be used. Instead of utilizing labels, the indicia may be molded into the container or bottle. Other distinguishing indicia can be adhered to the container. Thus the color indicia of the containers, compartments and groups of instructions on the cover are characterized by additional indicia differing from the written and color indicia and visually identifiable by a color blind person, such additional indicia preferably comprising varying patterns of lines. The indicia or labels can be applied in any position on the bottle where they are visible. It is also contemplated that the reagent in the bottles might be colored to indicate the different compartments in the container.

Where appropriate, a small measure of dry materials, such as a dipper having a 0.1 gram capacity is provided in the kit. In addition where it might facilitate addition of reagents, droppers can be provided.

The cover includes instructions in the form of the label 25 and is divided into zones 26, 27, 28, 29 that are further provided with color indicia and ruling indicia corresponding to the compartments to which the zones relate insofar as they set forth the instructions therein.

The label 25 further includes a heading 29.

The zones 26, 27, 28, 29 further include indicia 30, 31, 32, 33 in the form of consecutive numbers or letters to indicate the order in which tests are to be conducted.

In a typical boiler water drop test, the various zones preferably would contain the following instructions:

ZONE A

TOTAL HARDNESS

1. Fill sample tube to top of tape with sample.
2. Add 5 drops from blue bottle 1.
3. Add 1 dipper of powder from blue bottle 2.
4. Swirl to dissolve.
5. If sample turns blue, water is "zero" hardness.
6. If sample turns red or purple—add from blue bottle 3 one drop at a time and swirl each time until sample turns completely blue.
7. Each drop added equals 5 ppm Hardness.

ZONE B

"P" ALKALINITY

1. Fill sample tube to top of tape with sample.
2. Add 2 drops from white bottle 2. (Sample should turn red)
3. Add from white bottle 1, a drop at a time and swirl each time until red color disappears.
4. Multiply number of drops from white bottle 1 by 50 to obtain ppm alkalinity.

ZONE C

SULFITE

1. Fill sample tube to top of tape with sample. Sample should be at room temperature.
2. Add 1 drop of white bottle 2 and swirl.
3. Add from white striped bottle 2 while swirling until red color disappears.
4. Add 2 dippers from white striped bottle 2.
5. Add from white striped bottle 2 a drop at a time while swirling until a permanent blue color appears.
6. Multiply number of drops from white striped bottle 2 by 10 to obtain ppm sulfite.
7. Retain sample for chloride test of Zone D.

ZONE D

CHLORIDE

1. Fill dropper to mark from red bottle 3 and add to the above sample.
2. Shake and allow to stand 1 minute.
3. Add 5 drops from red bottle 4 and swirl.
4. Add from red bottle 5 a drop at a time and swirl each time until you obtain a permanent reddish color.
5. Multiply number of drops from red bottle 5 by 10 to obtain ppm chloride.

Figure 5:
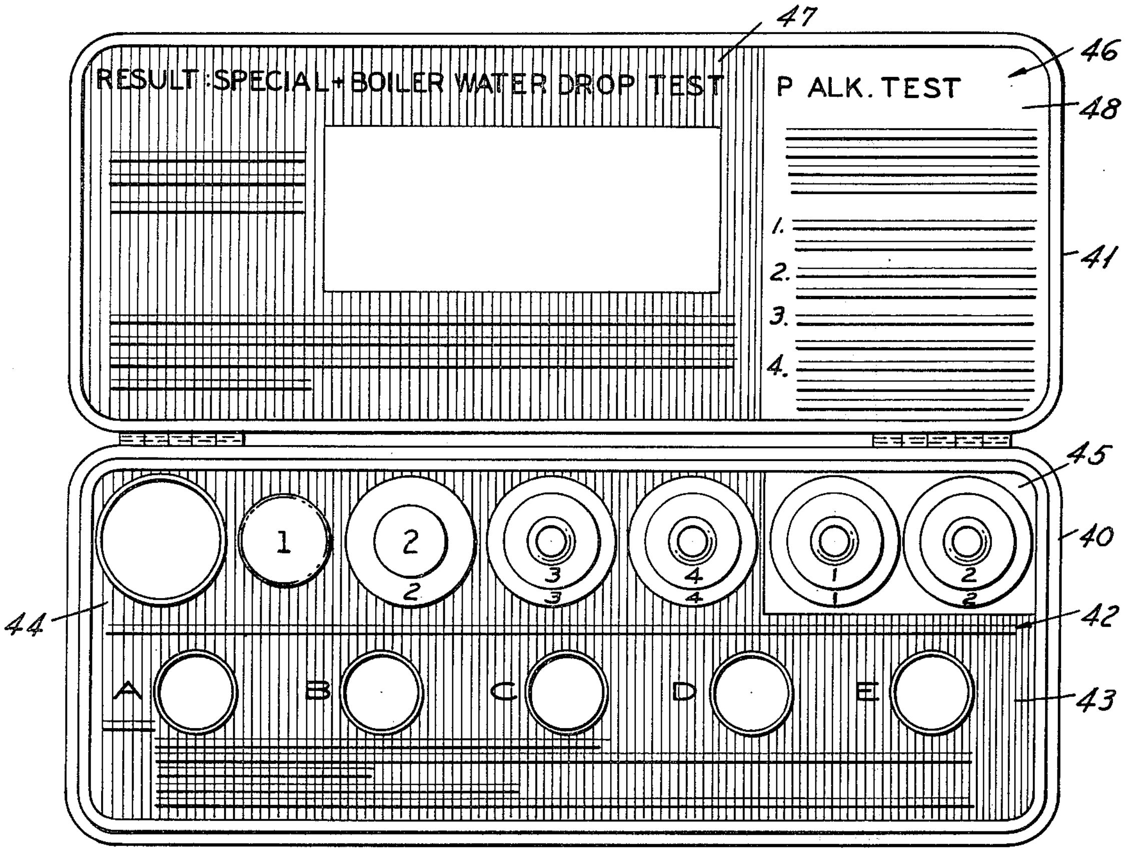
FIG. 5 is a plan view of a modified form of test kit with the cover open.
Figure 6:
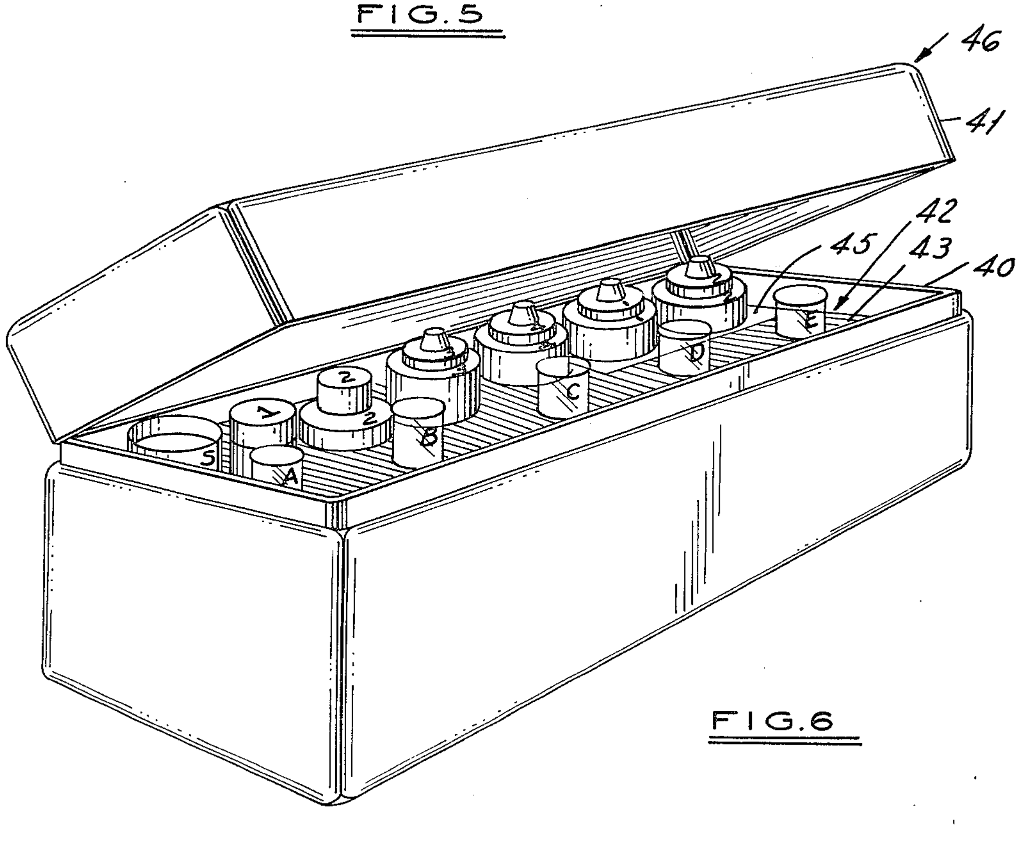
FIG. 6 is a perspective view thereof.

In the modified form of test kit shown in FIGS. 5 and 6, the kit comprises a housing 40 having a cover 41 hinged thereto with a divider 42 in the housing dividing the housing by colored and ruled indicia into compartments 43, 44, 45, compartment 43 having five container receiving positions, compartment 44 having five container receiving positions and compartment 45 having two container receiving positions. As in the previous form of the inventions, the compartments 43, 44, 45 are distinguished from one another by color. Since there are only two tests involved in this housing, only a color difference is provided since even a color blind person would distinguish between the red zones 43, 44 and the white compartment 45.

The cover 41 is provided with a label 46 divided into a zone 47 which is colored red and a white zone 48 colored white.

In a typical special water drop test and alkalinity test, the zones would have the following instructions thereon in addition to those shown in FIG. 5:

ZONE 47

SPECIAL*BOILER WATER DROP TEST (1) Fill the sample tube to the mark with the water being tested.
(2) Add a dipper from red bottle 1. Mix by swirling and ALLOW TO STAND FOR AT LEAST TEN MINUTES OR UNTIL ALL POWDER IS DISSOLVED.
(3) With the dropper add 1 ml of distilled water from red bottle 2 to each of the five tubes A, B, C, D, E.
(4) By means of the glass dropper add the prepared test sample in sample tube to the tubes as follows: TUBE A—4 drops, TUBE B—6 drops, TUBE C—10 drops, TUBE D—20 drops, TUBE E—nothing (blank). Mix contents of all tubes by swirling.
(5) Add 3 drops from red bottle 3 to each tube and mix by swirling.
(6) Add 2 drops from red bottle 4 to each tube and mix by swirling.
(7) TUBE E will develop an orange-red precipitate, compare with the other tubes and refer to table. For a tube to be considered red, it should be the same as the sample tube 5.

| | DROPS OF TEST SOLUTION | | | |
|---|---|---|---|---|
| (Parts per million) | 4 | 6 | 10 | 20 |
| 150 or more | W | W | W | W |
| 90 | R | W | W | W |
| 60 | R | R | W | W |
| 30 | R | R | R | W |
| Under 30 | R | R | R | R |

R = Red-Orange
W = White

Colors may take 1 to 2 minutes to develop but any color change after 5 minutes can be neglected. Interferences may be from organic materials at 50 ppm or above, or zinc ions at 30 ppm or higher. Phosphates and chromates do not interfere.

If a red precipitate accumulates in the tubes add a few drops from red bottle 4 and rinse out with water. Rinse tubes with distilled water from red bottle 2 before using.

ZONE 48

"P" ALK. TEST

This is a separate test. Use same sample tube as you did with first test—washed with distilled water from red bottle.

1. Fill sample tube to top of tape with sample.
2. Add 2 drops from white bottle 1. Sample should turn red.
3. Add from white bottle 2 a drop at a time swirling after each drop until red color disappears.
4. Multiply drops used from white bottle 2 by 50 to obtain ppm.

We claim:

1. In a chemical test kit, the combination comprising
a housing,
means within said housing dividing said housing into a plurality of compartments,
each compartment having a row of container receiving portions,
and a container in each said container receiving portion of each said compartment,
means associated with each compartment having color indicia, the color indicia of said compartments differing from one another,
the containers in each compartment having color indicia corresponding to the color indicia of their compartment,
said containers in each compartment having consecutive written number or letter indicia thereon indicating the sequence in which they are to be used in a test, a cover for said housing,
means for connecting said cover to said housing,
said cover having groups of written instructions thereon, the number of groups corresponding to the number of compartments, the written instructions for each group referring to the written indicia of that group,
the color indicia of each group of instructions being the same as the color indicia of the respective compartment,
said containers of each compartment, said compartments and said groups of instructions in said cover each being characterized by additional visual geometric indicia for each patterned relative to one another to be visually distinguishable by color blind persons and differing from one another and differing from said written and color indicia,
the additional indicia for color blind persons being the same for containers of each compartment, for the corresponding compartment and the group of instructions for that compartment; the additional indicia for color blind persons differing between compartments.

2. The combination set forth in claim 1 wherein said housing includes three compartments,
one of said compartments having five positions,
another of said compartments having five positions and a third compartment having two positions.

3. The combination set forth in claim 1 wherein said additional indicia comprises different patterns of lines on the compartments and on the respectively associated containers and cover groups of instructions.

4. The combination set forth in claim 3 wherein said housing is divided into three compartments, and said lines of one compartment comprise parallel lines in one direction,
said lines of another compartment comprise parallel lines in a direction opposite to said first-mentioned lines,
said lines of a third compartment comprising intersecting lines, and the respectively associated containers and cover groups of instructions are patterned in corresponding like manner.

5. The combination set forth in claim 1 wherein said containers comprise bottles and closures for said bottles,
said written and color indicia on said containers being provided on said closures and said bottles.

6. The combination set forth in claim 5 wherein said written and color indicia overlie one another.

7. The combination set forth in claim 1 wherein there are four compartments in said housing,
two of said compartments having three positions and the other two of said compartments having two positions.

8. The combination set forth in claim 7 wherein said housing includes a further compartment having two positions.

* * * * *